US012548719B2

(12) United States Patent
Kim

(10) Patent No.: US 12,548,719 B2
(45) Date of Patent: *Feb. 10, 2026

(54) CIRCUIT BREAKER WITH INTEGRATED SAFETY LOCK-OFF MECHANISM

(71) Applicant: Siemens Industry, Inc., Alpharetta, GA (US)

(72) Inventor: Raiden Jay Kim, Buford, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 277 days.

This patent is subject to a terminal disclaimer.

(21) Appl. No.: 18/319,936

(22) Filed: May 18, 2023

(65) Prior Publication Data

US 2023/0368988 A1 Nov. 16, 2023

Related U.S. Application Data

(63) Continuation of application No. 17/663,263, filed on May 13, 2022, now Pat. No. 11,728,104.

(51) Int. Cl.

*H01H 9/28* (2006.01)
*H01H 21/04* (2006.01)
*H01H 21/22* (2006.01)

(52) U.S. Cl.

CPC ............ *H01H 9/281* (2013.01); *H01H 21/04* (2013.01); *H01H 21/22* (2013.01)

(58) Field of Classification Search

CPC .... H01H 71/00; H01H 71/02; H01H 71/0214; H01H 71/0264; H01H 71/10; H01H 71/50; H01H 71/1018; H01H 71/054; H01H 2300/018; H01H 2071/10; H01H 2071/1009; H01H 9/20; H01H 9/26; H01H 9/281; H01H 13/72; H01H 13/76; H01H 21/00; H01H 21/04; H01H 21/22; H01H 9/28; H01H 9/282; H01H 9/285

USPC .......................................................... 200/335

See application file for complete search history.

(56) References Cited

U.S. PATENT DOCUMENTS 5,193,666 A * 3/1993 Markowski .............. H01H 3/20 74/544
2009/0071804 A1 * 3/2009 Drake .................... H01H 9/282 200/43.14

* cited by examiner

*Primary Examiner* — Anthony R Jimenez

(57) ABSTRACT

A circuit breaker is configured to ensure electrical safety when working on its circuits. The circuit breaker comprises a housing with an exterior boundary. The housing includes an "integrated" Lock-Off feature. It is integrated to one or more housing components of the circuit breaker not as a separate component to achieve most simplicity and least space used as compared to an "add-on" accessory based Lock-Off feature. The "integrated" Lock-Off feature has a feature that is configured to receive a shackle or a shank of a padlock. The circuit breaker further comprises a built-in Lock-Off mechanism including a handle that is configured to move relative to the feature. The built-in Lock-Off mechanism in combination with the Lock-Off feature is configured to prevent handle from being turned ON with the use of padlock. The padlock prevents circuit breaker from turning ON by impeding the handle from moving to an ON-position.

20 Claims, 10 Drawing Sheets

CIRCUIT BREAKER WITH INTEGRATED SAFETY LOCK-OFF MECHANISM

CROSS REFERENCE TO RELATED APPLICATIONS

The present application is a continuation of U.S. patent application Ser. No. 17/663,263 filed 13 May 2022 in the US Patent and Trademark Office, the content of which is hereby incorporated herein in its entirety.

1. Field

Aspects of the present invention generally relate to a circuit breaker with an integrated safety Lock-Off mechanism in which a Lock-Off feature prevents a handle from being turned on with the use of a common padlock.

2. Description of the Related Art

Circuit breakers, after installation inside load centers, sometimes require electrical technicians to work on various issues that may arise over their product lifetime. When electrical technicians open a load center to work on any electrical issues in circuits connected and powered through circuit breakers inside the load center, they must ensure any electrical connections that may be potentially dangerous are turned off. This is to guarantee no ground fault occurs. Ground fault is when electrical current finds an alternative path to the ground, possibly through the user or technician, resulting in potentially serious injuries or even death.

The circuit breakers on circuits that the technician works on often needs to have an additional safety guarantee other than switching the handle OFF. This is because the handle can be mistakenly turned ON if any unintended force is applied to the handle during the technician's operation around the circuit breaker.

There has not been any "integrated" Lock-Off feature. However, there are "add-on" accessories. These add-on accessories require the technicians to use an additional part along with a padlock to ensure the lock-off functionality. However, this solution requires a purchase of an additional accessory part along with the circuit breaker and requires more steps and complexity in installation. Therefore, this method is not only entirely different solution to achieve the Lock-Off function, but it also may be inferior.

Therefore, there is a need for a better safety Lock-Off mechanism for a circuit breaker.

SUMMARY

Briefly described, aspects of the present invention relate to an integrated safety Lock-Off mechanism for a circuit breaker in which a Lock-Off feature prevents a handle from being turned on with the use of a common padlock. An additional accessory part-based solution may be inferior when compared to an "integrated-lock-off-feature" invention in that the accessory is significantly more costly and adds complexity to the technician. The integrated circuit breaker safety Lock-Off mechanism addresses this problem (i.e., the handle can be mistakenly turned on if any unintended force is applied to the handle during the technician's operation around the breaker) by designing a built-in Lock-Off feature near the handle. The Lock-Off feature prevents the handle from being turned on with the use of a common padlock. After a technician turns OFF a circuit breaker, he or she then installs the padlock to guarantee that the breaker is always turned off, ensuring electrical safety when working on the circuits.

In accordance with one illustrative embodiment of the present invention, a circuit breaker is configured to ensure electrical safety when working on its circuits. The circuit breaker comprises a housing with an exterior boundary. The housing includes an "integrated" or "pre-installed" Lock-Off feature extending away from the exterior boundary. The Lock-Off feature has a hole that is configured to receive a shackle or a shank of a padlock. The circuit breaker further comprises a built-in Lock-Off mechanism including a handle integrated with the housing using a pivot such that the handle is configured to pivot relative to the hole in the Lock-Off feature. The built-in Lock-Off mechanism in combination with the Lock-Off feature is configured to prevent the handle from being turned ON with the use of the padlock. The padlock prevents the handle from rotating on its pivot such that the padlock disables the circuit breaker from turning ON by impeding the handle from rotating to an ON-position.

In accordance with one illustrative embodiment of the present invention, a method of ensuring electrical safety when working on circuits of a circuit breaker is provided. The method comprises providing a housing with an exterior boundary. The housing includes an "integrated" or "pre-installed" Lock-Off feature extending away from the exterior boundary. The Lock-Off feature has a hole that is configured to receive a shackle or a shank of a padlock. The method further comprises providing a built-in Lock-Off mechanism including a handle integrated with the housing using a pivot such that the handle is configured to pivot relative to the hole in the Lock-Off feature. The built-in Lock-Off mechanism in combination with the Lock-Off feature is configured to prevent the handle from being turned ON with the use of the padlock. The padlock prevents the handle from rotating on its pivot such that the padlock disables the circuit breaker from turning ON by impeding the handle from rotating to an ON-position.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Figure 1:
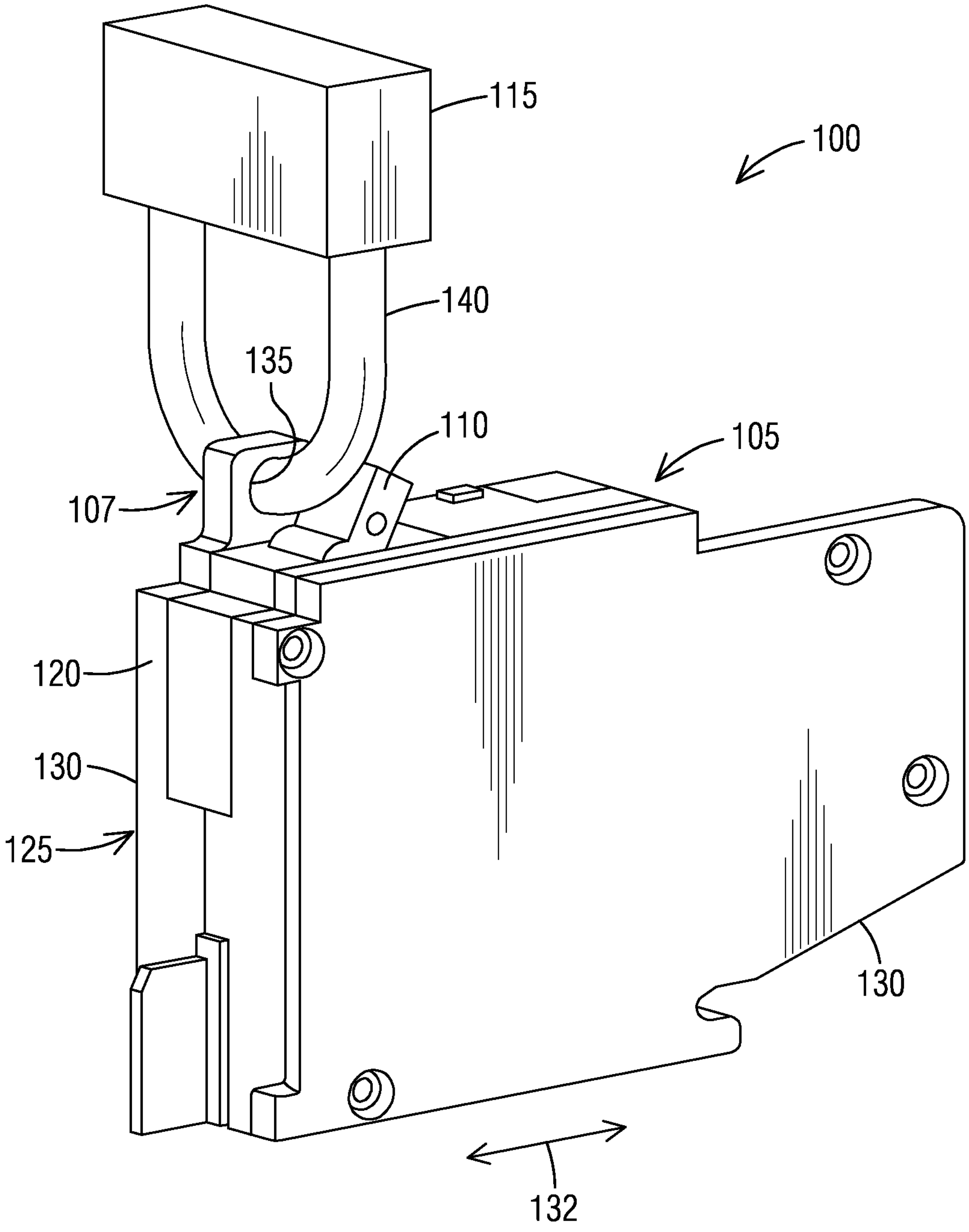
FIG. 1 illustrates a circuit breaker with an integrated circuit breaker safety Lock-Off mechanism in which a Lock-Off feature prevents a handle from being turned ON with the use of a common padlock in accordance with an exemplary embodiment of the present invention.

Various technologies that pertain to systems and methods that facilitate an integrated circuit breaker safety Lock-Off mechanism for a circuit breaker will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

To facilitate an understanding of embodiments, principles, and features of the present invention, they are explained hereinafter with reference to implementation in illustrative embodiments. In particular, they are described in the context of an integrated circuit breaker safety Lock-Off mechanism for a circuit breaker. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of the integrated circuit breaker safety Lock-Off mechanism for a circuit breaker according to the present disclosure are described below with reference to FIGS. 1-12 herein. Like reference numerals used in the drawings identify similar or identical elements throughout the several views. The drawings are not necessarily drawn to scale.

Consistent with one embodiment of the present invention, FIG. 1 represents a circuit breaker 100 with an integrated circuit breaker safety Lock-Off mechanism 105 in which a "pre-installed" Lock-Off feature 107 prevents a handle 110 from being turned ON with the use of a common padlock 115 in accordance with an exemplary embodiment of the present invention. Examples of the circuit breaker 100 include a ground-fault circuit interrupter (GFCI) or an arc-fault circuit interrupter (AFCI) or a solid-state circuit breaker or a thermal magnetic molded-case circuit breaker (MCCB) or a miniature circuit breaker (MCB) or a residential circuit breaker or an industrial circuit breaker.

The "pre-installed" Lock-Off feature 107 is integrated to a housing plastic 120 of the circuit breaker 100. This "pre-installed" Lock-Off feature 107 does not interfere with a normal operation of turning the circuit breaker 100 ON and OFF as shown in FIG. 1. The only time this external feature is utilized is when a technician works on any issues around the circuit breaker 100. The technician would first turn OFF the circuit breaker 100 by moving the handle 110 to the right relative to the position shown in FIG. 1. Then, he or she would install a padlock—any common padlock that fits the hole size—on the circuit breaker 100. This prevents the handle 110 from being moved to the left, meaning it disables the circuit breaker 100 from turning ON until the padlock 115 is unlocked and removed.

Utilizing an integrated feature on a plastic base 125 of the circuit breaker 100 saves any added costs that may arise with any other complex features or "add-on" accessories. This simple integrated circuit breaker safety Lock-Off mechanism 105 provides electrical safety to technicians working on circuit breaker products. The mechanism 105 also allows the technicians to have easier time working, since the mechanism 105 is simple and only takes a small amount of space, providing the technician with more room to work with around the circuit breaker 100.

The circuit breaker 100 is configured to ensure electrical safety when a technician is working on its circuits. The circuit breaker 100 comprises a housing 130 with an exterior boundary 132. The housing 130 includes the "pre-installed" Lock-Off feature 107 extending away from the exterior boundary 132. The "pre-installed" Lock-Off feature 107 has a hole 135 that is configured to receive a shackle or a shank 140 of the padlock 115.

The circuit breaker 100 further comprises the built-in Lock-Off mechanism 105 including the handle 110 being integrated with the housing 130 using a pivot (not seen) such that the handle 110 is configured to pivot relative to the hole 135 in the "pre-installed" Lock-Off feature 107. The built-in Lock-Off mechanism 105 is configured to prevent the handle 110 from being turned ON with the use of the padlock 115. The padlock 115 prevents the handle 110 from rotating on its pivot such that the padlock 115 disables the circuit breaker 100 from turning ON by impeding the handle 110 from rotating to an ON-position.

Figure 2:
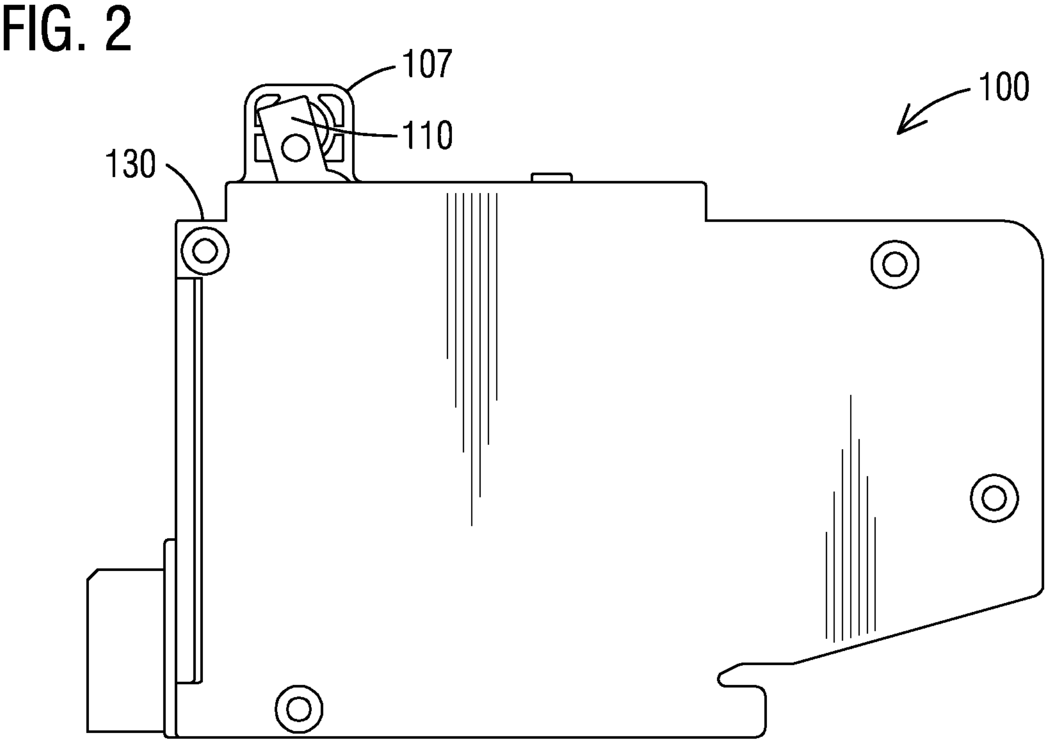
FIG. 2 illustrates a circuit breaker turned ON in accordance with an exemplary embodiment of the present invention.

Referring to FIG. 2, it illustrates the circuit breaker 100 turned ON in accordance with an exemplary embodiment of the present invention. The "pre-installed" Lock-Off feature 107 is integrated to the housing 130 plastic of the circuit breaker 100. This "pre-installed" Lock-Off feature 107 does not interfere with a normal operation of turning the circuit breaker 100 ON and OFF. The technician would turn ON the circuit breaker 100 by moving the handle 110 to the left relative to the position shown in FIG. 1.

Figure 3:
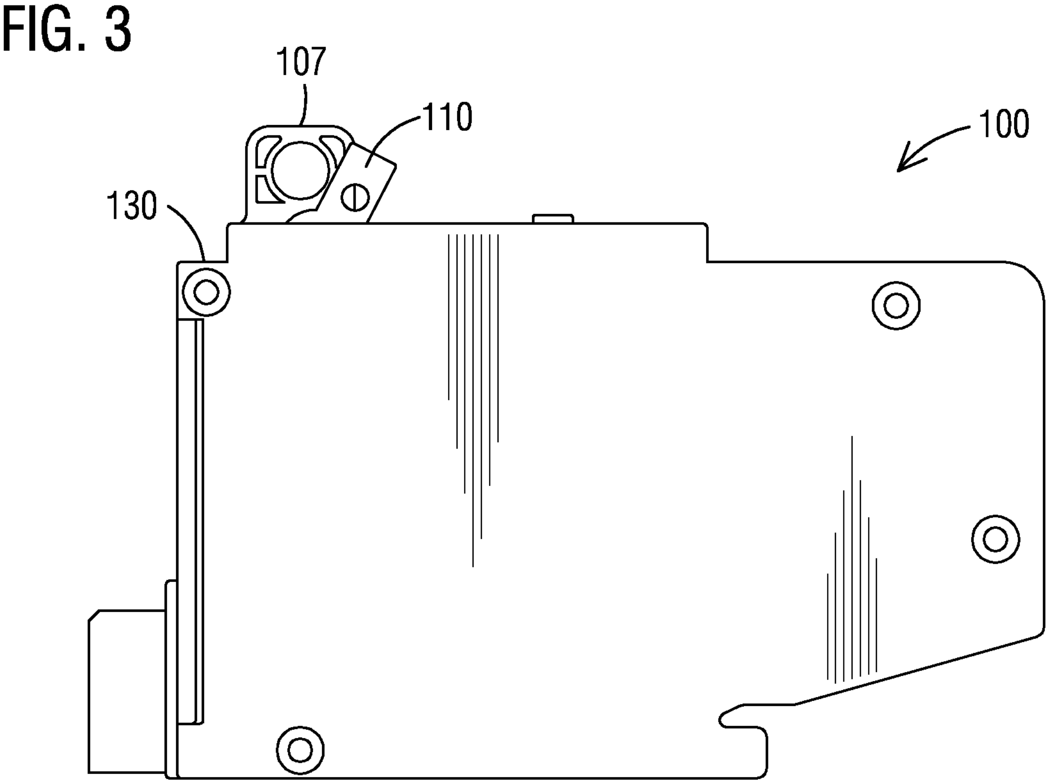
FIG. 3 illustrates a circuit breaker turned OFF in accordance with an exemplary embodiment of the present invention.

Turning now to FIG. 3, it illustrates the circuit breaker 100 turned OFF in accordance with an exemplary embodiment of the present invention. The technician would turn OFF the circuit breaker 100 by moving the handle 110 to the right relative to the position shown in FIG. 1.

Figure 4:
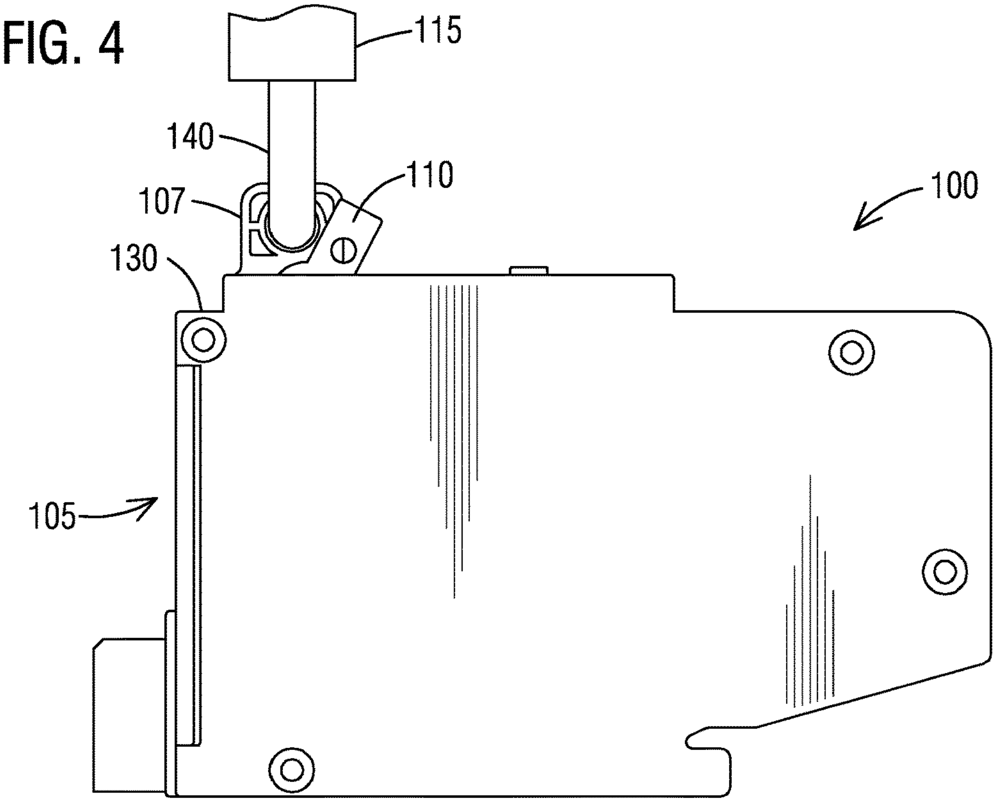
FIG. 4 illustrates a padlock installed on the circuit breaker at OFF position in accordance with an exemplary embodiment of the present invention.

FIG. 4 illustrates a padlock installed on the circuit breaker 100 at OFF position in accordance with an exemplary embodiment of the present invention. The built-in Lock-Off mechanism 105 is configured to prevent the handle 110 from being turned ON with the use of the padlock 115.

Figure 5:
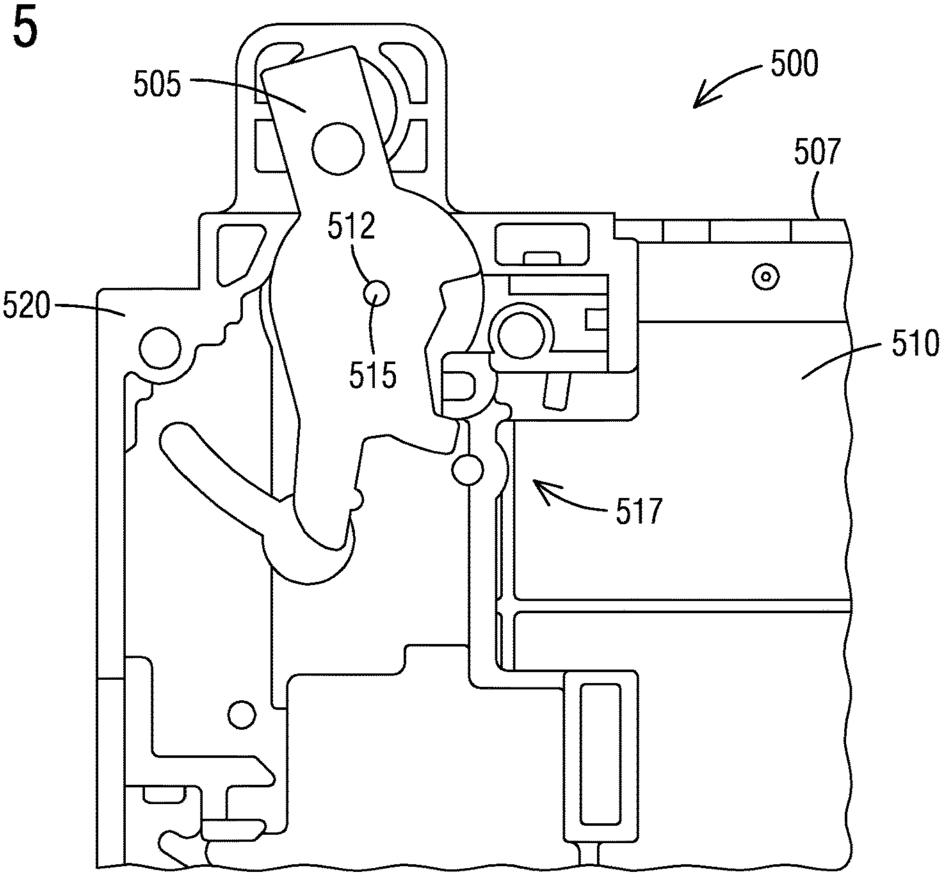
FIG. 5 illustrates a handle when turned ON (without padlock) in accordance with an exemplary embodiment of the present invention.
Figure 6:
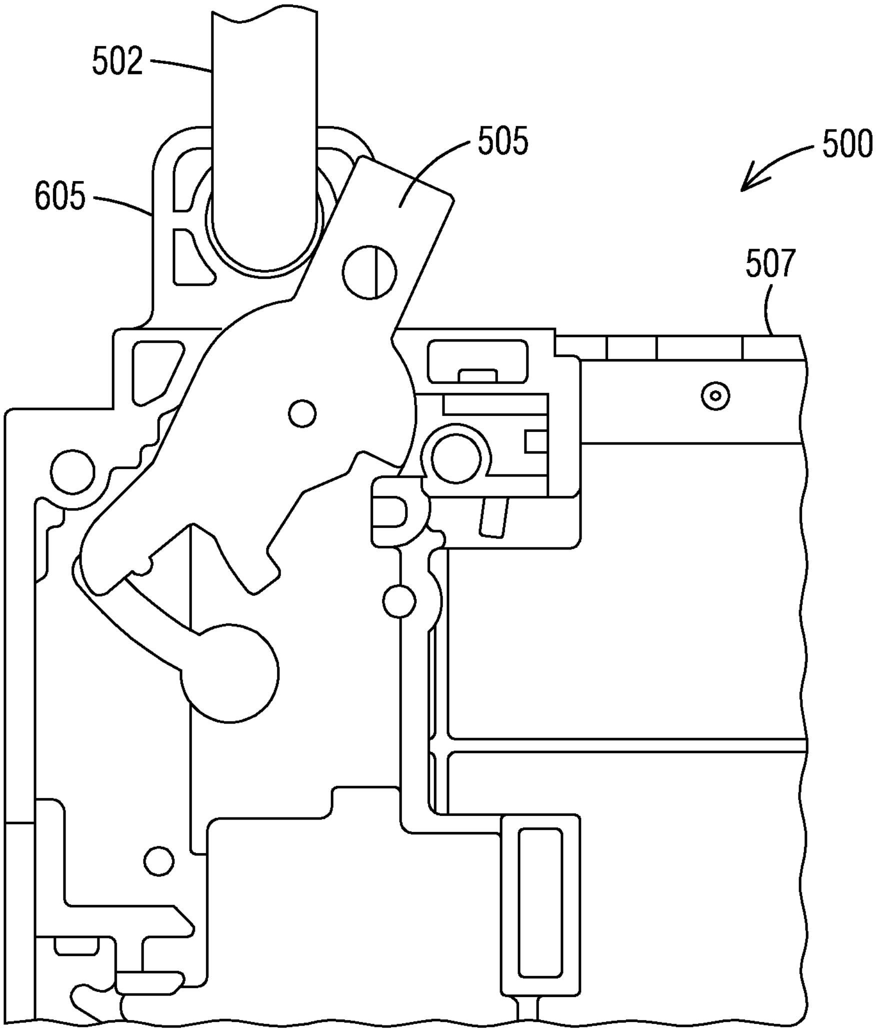
FIG. 6 illustrates a handle when turned OFF (locked with padlock) in accordance with an exemplary embodiment of the present invention.

As seen in FIG. 5, it illustrates a handle 505 when turned ON (without a padlock 502 (as shown in FIG. 6)) in accordance with an exemplary embodiment of the present invention. A housing 507 of a circuit breaker 500 includes a main base 510 having a handle pivot hole (not seen). A pivot 512 of the handle 505 includes a dowel pin 515. A built-in Lock-Off mechanism 517 of the circuit breaker 500 includes a modular base 520 that connects the pivot 512 of the handle 505 to the main base 510. The handle 505 is connected to the modular base 520 using the dowel pin 515 inside the pivot 512 of the handle 505.

As shown in FIG. 6, it illustrates the handle 505 when turned OFF (locked with the padlock 502) in accordance with an exemplary embodiment of the present invention. The circuit breaker 500 includes an "integrated" Lock-Off feature 605. The circuit breaker 500 achieves a Lock-Off function that provides a better safety Lock-Off mechanism for the circuit breaker 500. The "integrated" Lock-Off feature 605 prevents the handle 505 from being turned on with the use of the padlock 502.

In one embodiment, the "integrated" Lock-Off feature 605 is a feature that is "built-in" onto the existing plastic housing 507 of the circuit breaker 500. In other words, it is not necessary to have an externally added accessory or other complex part that one needs to purchase separately and then be assembled onto a circuit breaker by a user. So, the circuit breaker 500 will have the "integrated" Lock-Off feature 605 more or less "pre-installed" into the circuit breaker 500 in a simple and efficient method without needing another product.

The circuit breaker's 500 on circuits that the technician works on often needs to have an additional safety guarantee other than switching the handle 505 OFF. This is provided here by instant solution because the handle 505 cannot be mistakenly turned ON if any unintended force is applied to the handle 505 during the technician's operation around the circuit breaker 500. A commercial metal padlock would provide a strong lock that cannot be overcome by a user, unless removed with a use of key.

Figure 7:
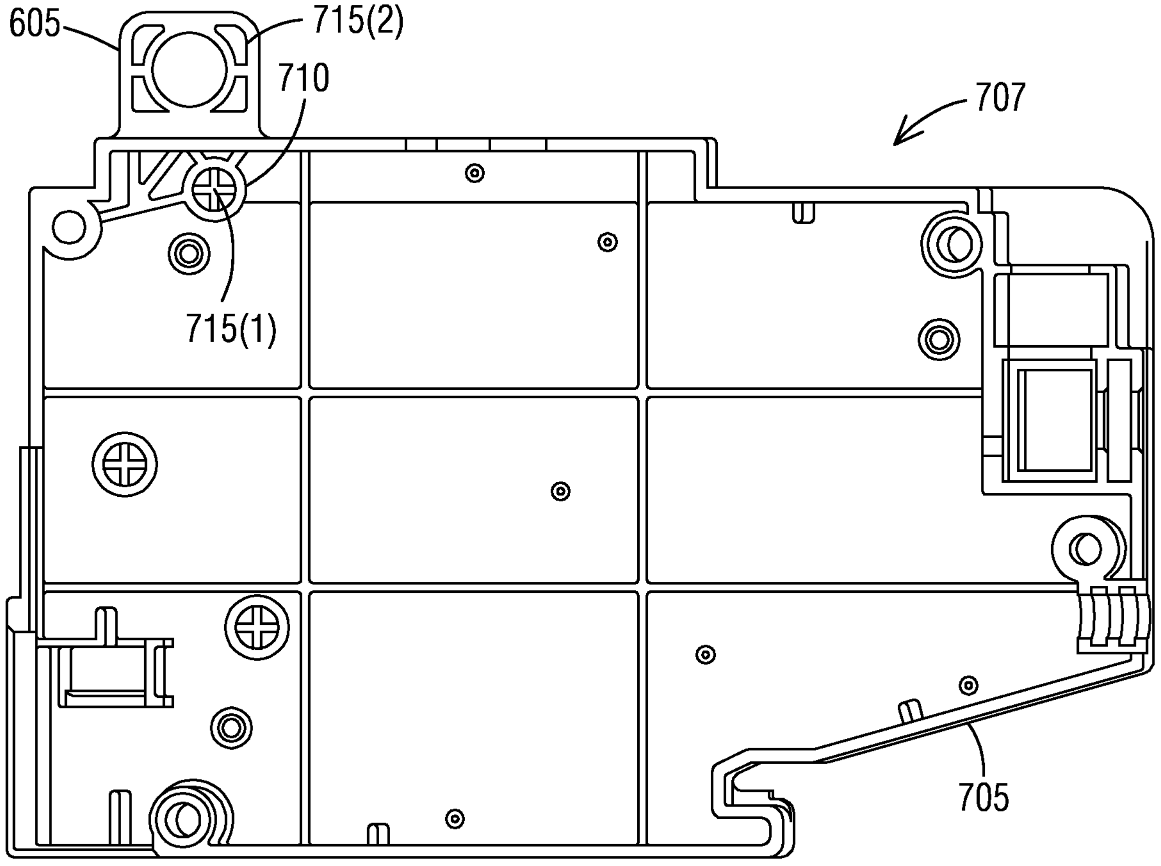
FIG. 7 illustrates a main base without other circuit breaker components in accordance with an exemplary embodiment of the present invention.

In FIG. 7, it illustrates a main base 705 without other circuit breaker components in accordance with an exemplary embodiment of the present invention. A housing 707 includes the main base 705 having a handle pivot hole 710. The handle pivot hole 710 includes a plurality of first ribs 715(1) and the "integrated" Lock-Off feature 605 includes a plurality of second ribs 715(2) to respectively strengthen the handle pivot hole 710 and the "integrated" Lock-Off feature 605 from breaking during a forceful operation by a user.

Figure 8:
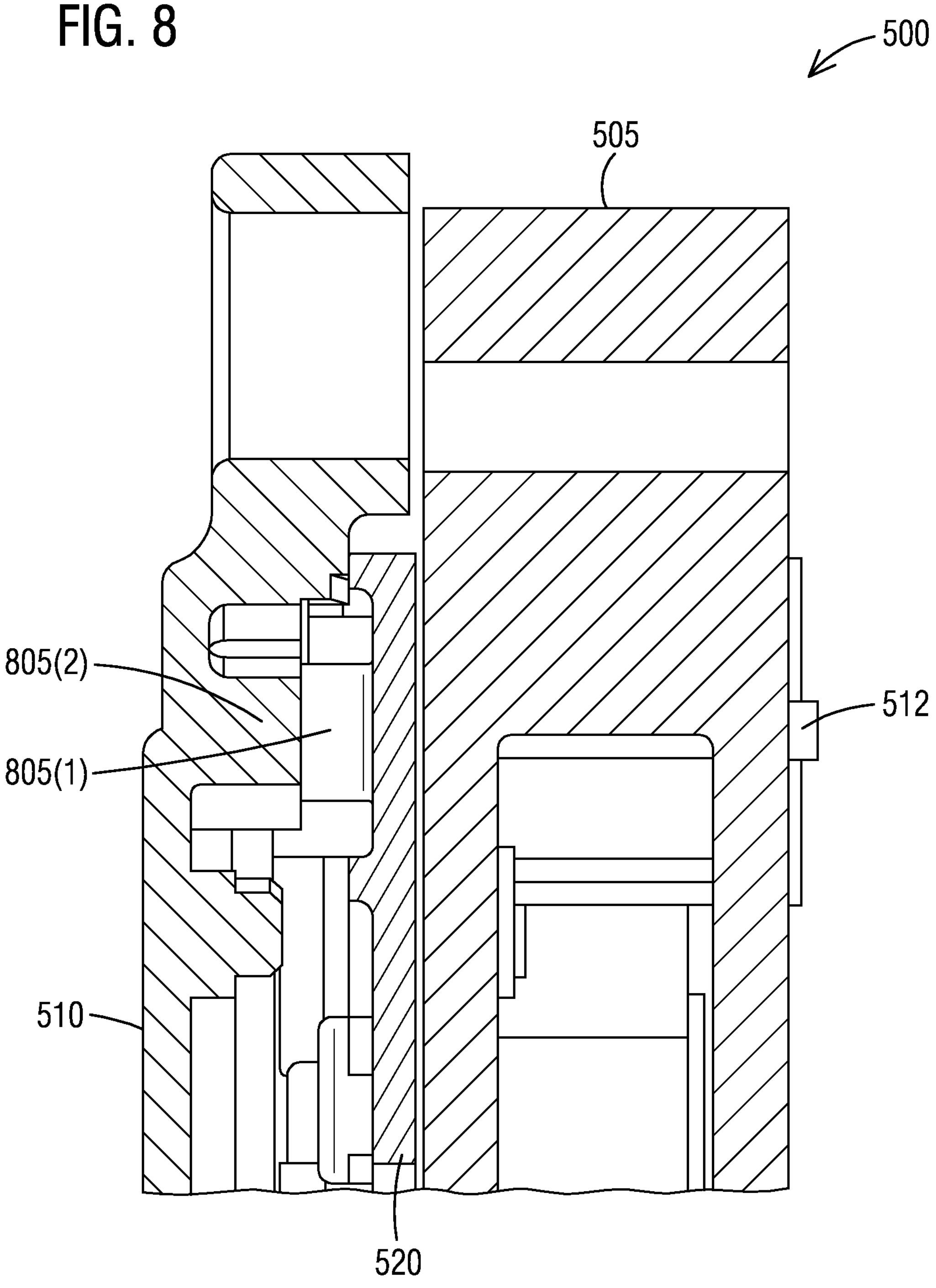
FIG. 8 illustrates a side view when turned ON (without padlock) in accordance with an exemplary embodiment of the present invention.
Figure 9:
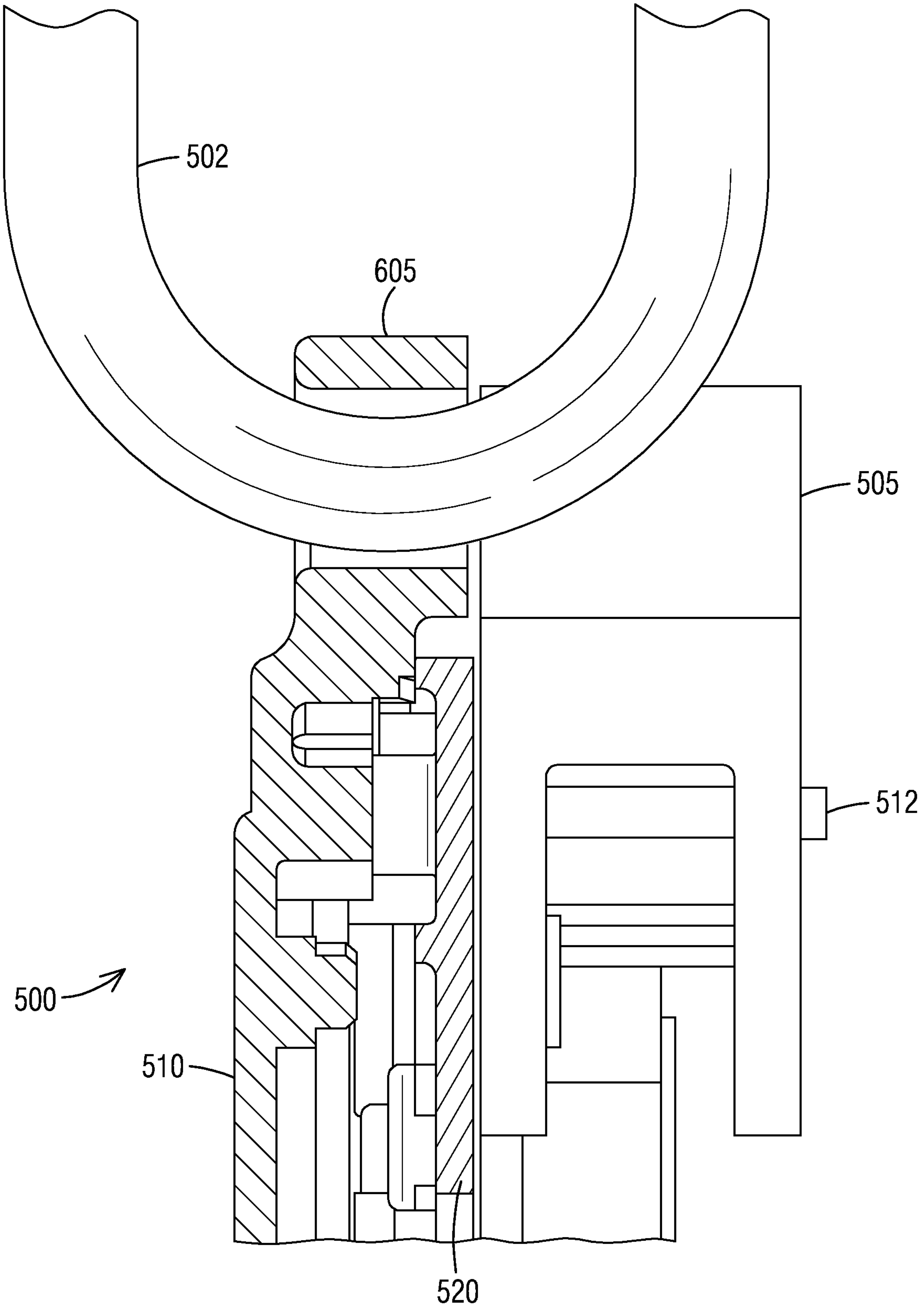
FIG. 9 illustrates a side view when turned OFF (locked with padlock) in accordance with an exemplary embodiment of the present invention.

With regard to FIG. 8, it illustrates a side view of the circuit breaker 500 when turned ON (without the padlock 502) in accordance with an exemplary embodiment of the present invention. With respect to FIG. 9, it illustrates a side view of the circuit breaker 500 when turned OFF (locked with the padlock 502) in accordance with an exemplary embodiment of the present invention.

Referring back to FIGS. 5 and 8, the pivot 512 of the handle 505 includes a first handle pivot 805(1) on the modular base 520 and a second handle pivot 805(2) on the main base 510. The main base 510 has the second handle pivot 805(2) connecting the modular base 520 to the main base 510 and sharing the same pivot 512 of the handle 505. The handle 505 is configured to pivot in the modular base 520 such that the modular base 520 is sandwiched between the main base 510 and the handle 505.

Figure 10:
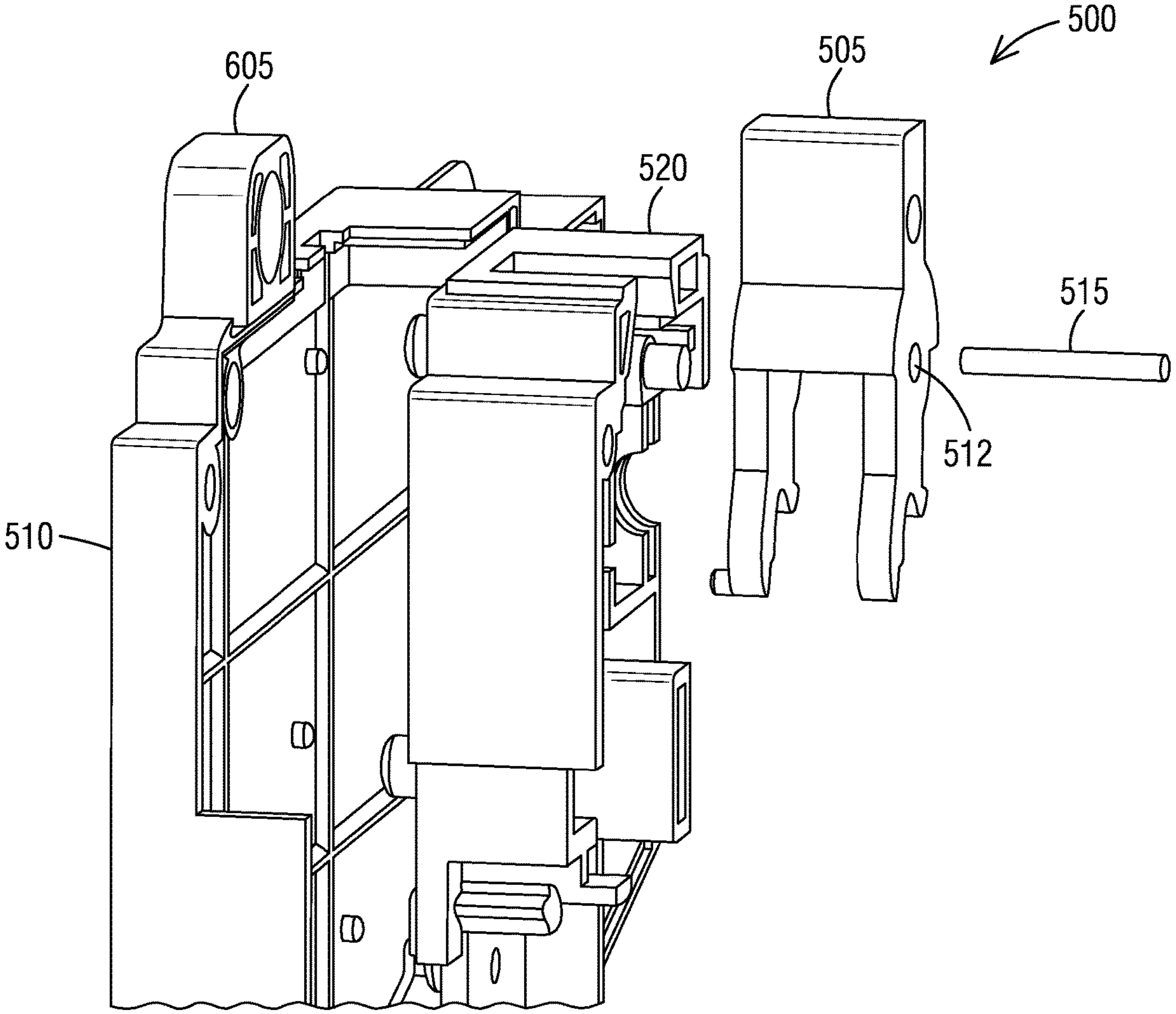
FIG. 10 illustrates an exploded view from side in accordance with an exemplary embodiment of the present invention.
Figure 11:
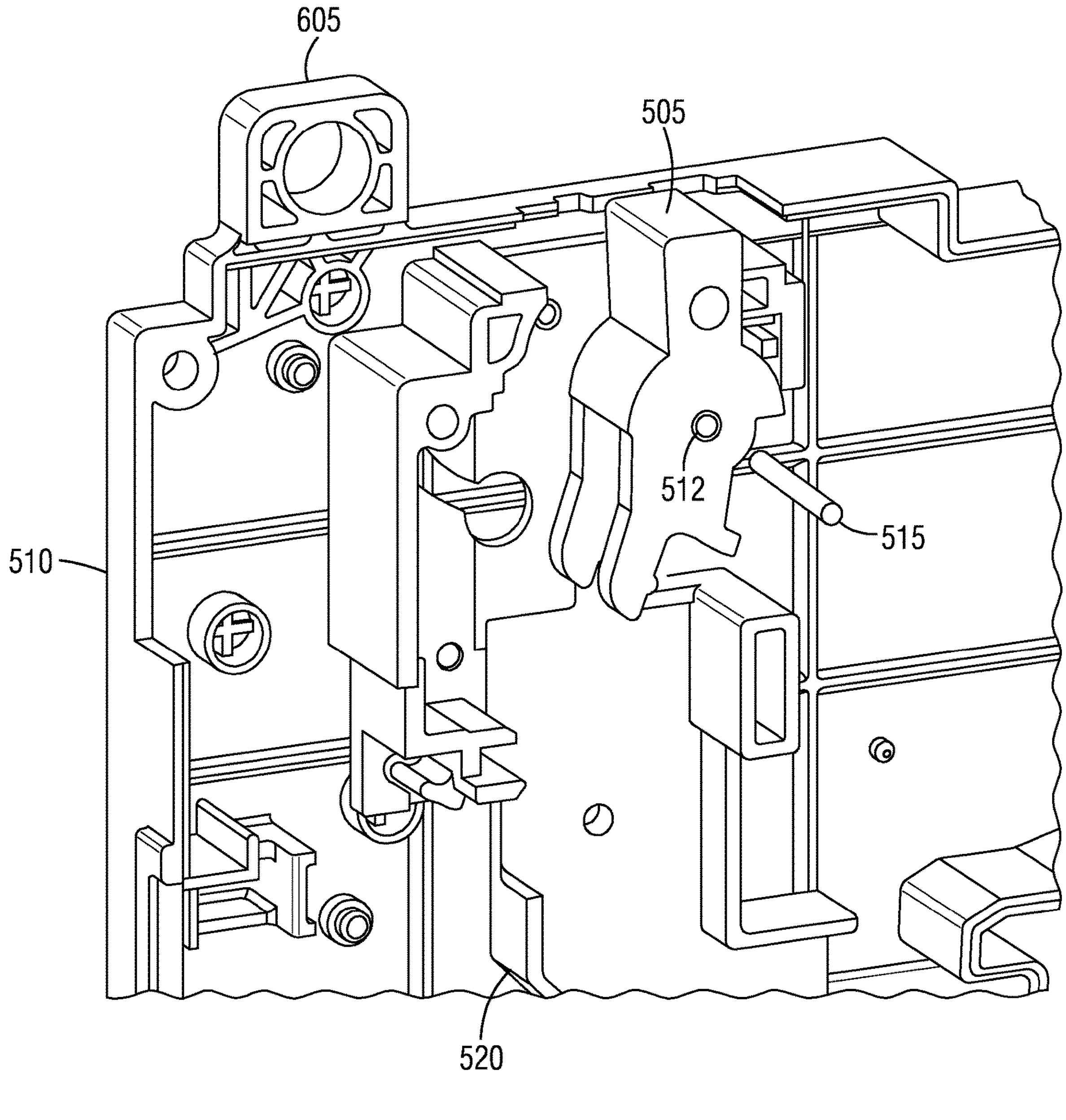
FIG. 11 illustrates an exploded view from front in accordance with an exemplary embodiment of the present invention.

FIG. 10 illustrates an exploded view the circuit breaker 500 from side in accordance with an exemplary embodiment of the present invention. FIG. 11 illustrates an exploded view the circuit breaker 500 from front in accordance with an exemplary embodiment of the present invention.

Figure 12:
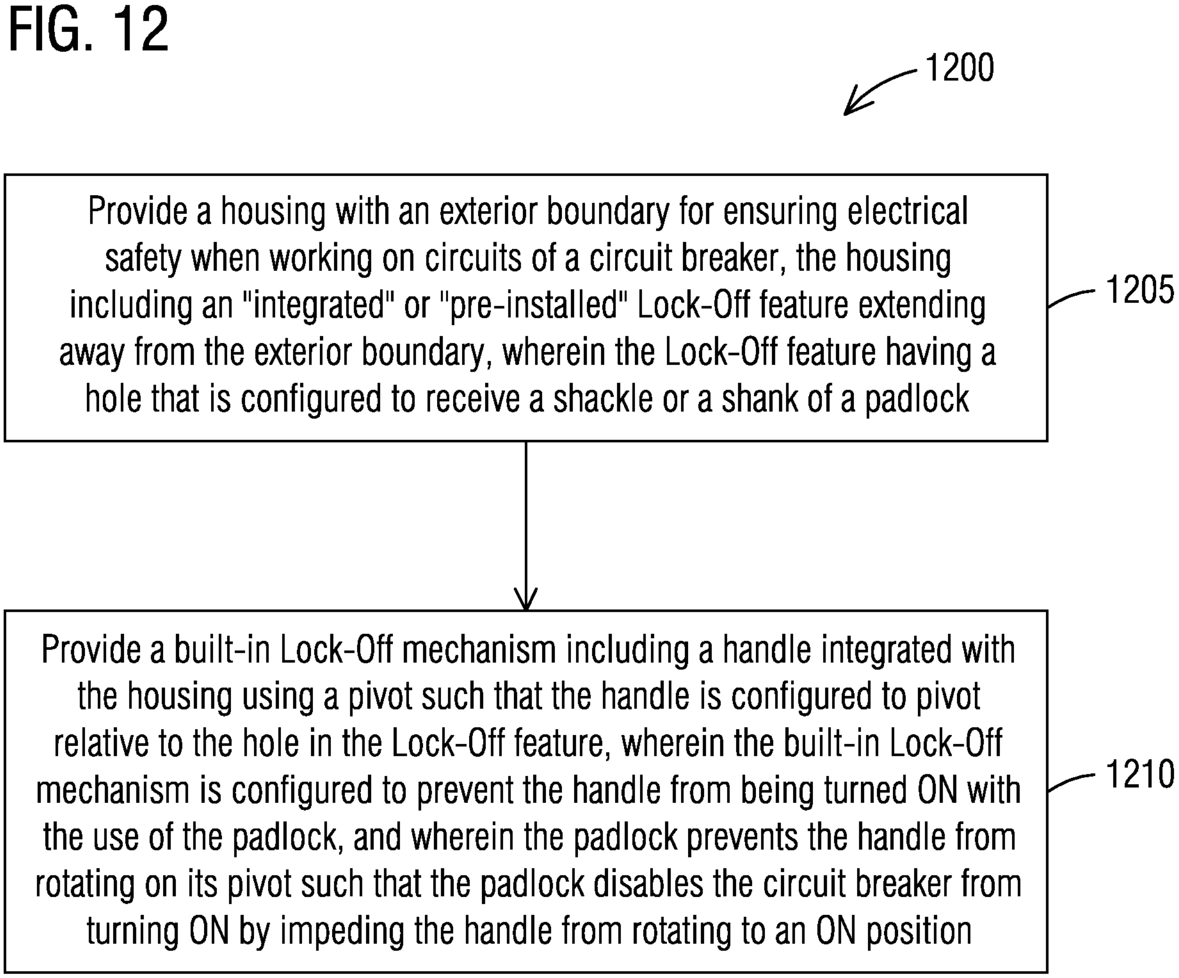
FIG. 12 illustrates a schematic view of a flow chart of a method of ensuring electrical safety when working on circuits of a circuit breaker in accordance with an exemplary embodiment of the present invention.

FIG. 12 illustrates a schematic view of a flow chart of a method of ensuring electrical safety when working on circuits of the circuit breaker 500 in accordance with an exemplary embodiment of the present invention. Reference is made to the elements and features described in FIGS. 1-11. It should be appreciated that some steps are not required to be performed in any particular order, and that some steps are optional.

The method 1200 comprises a step 1205 of providing a housing with an exterior boundary such that the housing including a Lock-Off feature extending away from the exterior boundary. The Lock-Off feature has a hole that is configured to receive a shackle or a shank of a padlock. The method 1200 further comprises a step 1210 of providing a built-in Lock-Off mechanism including a handle integrated with the housing using a pivot such that the handle is configured to pivot relative to the hole in the Lock-Off feature. The built-in Lock-Off mechanism is configured to prevent the handle from being turned ON with the use of the padlock. The padlock prevents the handle from rotating on its pivot such that the padlock disables the circuit breaker from turning ON by impeding the handle from rotating to an ON-position.

While a design of a common padlock is described here a range of one or more other padlocks are also contemplated by the present invention in case the handle is not adjacent to the housing. For example, other padlocks with a square-shaped shackle or a square-shaped shank for more lateral reach to block the handle instead of a long-neck padlocks may be implemented based on one or more features presented above without deviating from the spirit of the present invention.

The techniques described herein can be particularly useful for a Lock-Off feature built in a main base of the housing. While particular embodiments are described in terms of the Lock-Off feature built in the main base of the housing, the techniques described herein are not limited to such designs but can also be used with the modular base in which the Lock-Off feature is built in the modular base of the housing.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A circuit breaker, comprising:

a housing with an exterior boundary, the housing including a fixed lock-off feature extending away from the exterior boundary, wherein the fixed lock-off feature is configured to receive a shackle or a shank of a padlock; and a built-in safety mechanism including a handle that is configured to move relative to the fixed lock-off feature, wherein the built-in safety mechanism in combination with the fixed lock-off feature is configured to prevent the handle from being turned ON with the use of the padlock, wherein the padlock prevents the circuit breaker from turning ON by impeding the handle from moving to an ON-position, and wherein, when the circuit breaker is turned ON, the handle of the built-in safety mechanism covers the fixed lock-off feature preventing the shackle or the shank of the padlock from being installed in the fixed lock-off feature.

2. The circuit breaker of claim 1, wherein the circuit breaker is a ground-fault circuit interrupter (GFCI) or an arc-fault circuit interrupter (AFCI) or a solid-state circuit breaker or a thermal magnetic molded-case circuit breaker (MCCB) or a miniature circuit breaker (MCB) or a residential circuit breaker or an industrial circuit breaker.

3. The circuit breaker of claim 1, wherein the housing includes a main base having a handle pivot hole.

4. The circuit breaker of claim 3, wherein the handle pivot hole includes first ribs and the fixed lock-off feature includes second ribs to respectively strengthen the handle pivot hole and the fixed lock-off feature.

5. The circuit breaker of claim 4, wherein a pivot of the handle includes a dowel pin.

6. The circuit breaker of claim 5, wherein the built-in safety mechanism includes a modular base that connects the pivot of the handle to the main base.

7. The circuit breaker of claim 6, wherein the handle is connected to the modular base using the dowel pin inside the pivot of the handle.

8. The circuit breaker of claim 7, wherein the pivot of the handle includes a first handle pivot on the modular base and a second handle pivot on the main base.

9. The circuit breaker of claim 8, wherein the main base has the second handle pivot connecting the modular base to the main base and sharing the pivot of the handle.

10. The circuit breaker of claim 9, wherein the handle is configured to pivot in the modular base such that the modular base is sandwiched between the main base and the handle.

11. A method, comprising:

providing a housing with an exterior boundary, the housing including a fixed lock-off feature extending away from the exterior boundary, wherein the fixed lock-off feature is configured to receive a shackle or a shank of a padlock; and providing a built-in safety mechanism including a handle that is configured to move relative to the fixed lock-off feature, wherein the built-in safety mechanism in combination with the fixed lock-off feature is configured to prevent the handle from being turned ON with the use of the padlock, wherein the padlock prevents the circuit breaker from turning ON by impeding the handle from moving to an ON-position, and wherein, when the circuit breaker is turned ON, the handle of the built-in safety mechanism covers the fixed lock-off feature preventing the shackle or the shank of the padlock from being installed in the fixed lock-off feature.

12. The method of claim 11, wherein the circuit breaker is a ground-fault circuit interrupter (GFCI) or an arc-fault circuit interrupter (AFCI) or a solid-state circuit breaker or a thermal magnetic molded-case circuit breaker (MCCB) or a miniature circuit breaker (MCB) or a residential circuit breaker or an industrial circuit breaker.

13. The method of claim 11, wherein the housing includes a main base having a handle pivot hole.

14. The method of claim 13, wherein the handle pivot hole includes first ribs and the fixed lock-off feature includes second ribs to respectively strengthen the handle pivot hole and the fixed lock-off feature.

15. The method of claim 14, wherein a pivot of the handle includes a dowel pin.

16. The method of claim 15, wherein the built-in safety mechanism includes a modular base that connects the pivot of the handle to the main base.

17. The method of claim 16, wherein the handle is connected to the modular base using the dowel pin inside the pivot of the handle.

18. The method of claim 17, wherein the pivot of the handle includes a first handle pivot on the modular base and a second handle pivot on the main base.

19. The method of claim 18, wherein the main base has the second handle pivot connecting the modular base to the main base and sharing the pivot of the handle.

20. The method of claim 19, wherein the handle is configured to pivot in the modular base such that the modular base is sandwiched between the main base and the handle.

* * * * *